United States Patent
Fraser et al.

(10) Patent No.: US 9,505,298 B2
(45) Date of Patent: Nov. 29, 2016

(54) HIGH SPEED TRACTION MOTOR FOR A VEHICLE ALSO HAVING AN AUXILIARY OPEN BRAYTON CYCLE POWER ASSIST AND RANGE EXTENDER

(71) Applicant: BorgWarner Inc, Auburn Hills, MI (US)

(72) Inventors: Brock Fraser, Asheville, NC (US); Philip J Mott, Dryden, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/645,907

(22) Filed: Mar. 12, 2015

(65) Prior Publication Data

US 2016/0263985 A1  Sep. 15, 2016

(51) Int. Cl.
*B60K 6/40* (2007.10)
*B60K 6/48* (2007.10)
*B60K 3/04* (2006.01)
*B60W 10/08* (2006.01)
(Continued)

(52) U.S. Cl.
CPC . *B60K 6/48* (2013.01); *B60K 3/04* (2013.01); *B60K 5/04* (2013.01); *B60K 6/24* (2013.01); *B60K 7/00* (2013.01); *B60K 17/046* (2013.01); *B60L 11/14* (2013.01); *B60L 11/18* (2013.01); *B60L 15/20* (2013.01); *B60W 20/10* (2013.01); *B60K 2006/4825* (2013.01); *B60K 2007/003* (2013.01)

(58) Field of Classification Search
CPC ............ B60K 6/48; B60K 3/04; B60K 6/40; B60W 10/08

USPC ....................................................... 180/65.25
See application file for complete search history.

(56) References Cited

U.S. PATENT DOCUMENTS 2,663,146 A * 12/1953 Legendre ................ F01K 23/10
                                                                290/11
3,525,874 A    8/1970 Toy
(Continued)

FOREIGN PATENT DOCUMENTS

WO          9608388 A1    3/1996

OTHER PUBLICATIONS

Jeff Cobb, Wrightspeed Combines Gas Turbine and Batteries for Big Fuel Savings, Website, Feb. 18, 2014, htpp://www.hybrid cars.com.

(Continued)

*Primary Examiner* — Bryan Evans
(74) *Attorney, Agent, or Firm* — A. Michael Tucker; Stephan A. Pendorf; Patent Central LLC

(57) ABSTRACT

A drive system (1) for a vehicle includes an electric motor (12) and a gas turbine assembly (28). The electric motor (12) includes a rotor (16) coupled to a drive shaft (14). The gas turbine assembly (28) includes a turbine (30) including a turbine wheel (34) mounted on the drive shaft (14), a burner (70) that burns fuel and provides exhaust gas to drive the turbine wheel (34), and a compressor (50) that provides compressed air to the burner (70). The gas turbine assembly (28) is coupled to the drive shaft (14) of the electric motor (12). The drive system (1) also includes gear train unit (90) that has the drive shaft (14) as an input shaft, has an output shaft (94) connected to vehicle wheels (100), and transmits power from one of the electric motor (12) or gas turbine assembly (28) to the wheels (100).

14 Claims, 5 Drawing Sheets

(51) Int. Cl.
    *B60K 6/24*       (2007.10)
    *B60K 5/04*       (2006.01)
    *B60K 17/04*     (2006.01)
    *B60L 11/14*     (2006.01)
    *B60L 11/18*     (2006.01)
    *B60L 15/20*     (2006.01)
    *B60W 20/00*    (2016.01)
    *B60K 7/00*       (2006.01)

(56) References Cited

U.S. PATENT DOCUMENTS

| | | |
|---|---|---|
| 3,970,163 A | 7/1976 | Kinoshita |
| 4,157,011 A | 6/1979 | Liddle |
| 5,828,137 A | 10/1998 | Selfors |
| 6,213,234 B1 | 4/2001 | Rosen et al. |
| 7,578,363 B2 * | 8/2009 | Kim .................... B60K 6/365 180/165 |
| 7,958,727 B2 | 6/2011 | Arnold |
| 8,286,742 B2 | 10/2012 | Hotto |
| 8,346,419 B2 | 1/2013 | Kelty et al. |
| 8,428,806 B2 | 4/2013 | Kelty et al. |
| 8,463,480 B2 | 6/2013 | Kelty et al. |
| 8,463,481 B2 | 6/2013 | Kelty et al. |
| 8,718,897 B2 | 5/2014 | Wright et al. |
| 2012/0273288 A1 | 11/2012 | Yamazaki et al. |
| 2014/0207320 A1 | 7/2014 | Wright et al. |
| 2014/0245748 A1 * | 9/2014 | Anghel .................... F01D 15/10 60/783 |

OTHER PUBLICATIONS

Written Opinion and International Search Report dated May 23, 2016, in International Application No. PCT/US2016/022053.

* cited by examiner

HIGH SPEED TRACTION MOTOR FOR A VEHICLE ALSO HAVING AN AUXILIARY OPEN BRAYTON CYCLE POWER ASSIST AND RANGE EXTENDER

FIELD OF THE INVENTION

The invention relates to a drive system for a passenger car and/or commercial vehicle, the drive system including an electric motor-generator and a gas turbine assembly used to assist, or as an alternative power source to, the electric motor-generator.

BACKGROUND

Passenger car and commercial vehicle manufactures are turning to hybrid vehicles as a way to meet increasingly stringent emissions standards such as the Corporate Average Fuel Economy (CAFE) requirements. Hybrid vehicles use two or more power sources to achieve vehicle propulsion. Although most often associated with an electric motor in combination with an internal combustion engine, hybrid vehicles are not limited to these particular power sources. In addition to reduced emissions, hybrid vehicles offer improved fuel economy relative to conventional non-hybrid vehicles.

However, despite the clear benefits of using hybrid vehicles, they are costly to manufacture and vehicle driving ranges remain limited by current battery technologies. For these reasons, an improved vehicle drive system is needed that can address these issues.

SUMMARY

In some aspects, a vehicle drive system for driving one or more wheels of a vehicle includes an electric motor operatively directly coupled to a shaft for driving the wheel, and a gas turbine assembly including a turbine, a compressor, a burner and a recuperator. The gas turbine assembly is directly coupled to the shaft independent of the electric motor for driving the wheel. The vehicle drive system also includes a gear train unit. The gear train unit is operatively coupled between the shaft and the wheel of the vehicle for transmitting power from one of the electric motor or gas turbine assembly to the wheel.

In some aspects, a vehicle drive system for driving a wheel of a vehicle includes a drive shaft; an electric motor including a rotor coupled to the drive shaft and a stator that receives the rotor; and a gas turbine assembly. The gas turbine assembly includes a turbine including a turbine wheel mounted on the drive shaft, a burner that burns fuel and provides exhaust gas to drive the turbine wheel, and a compressor that provides compressed air to the burner. The compressor includes a compressor wheel mounted on the drive shaft. The gas turbine assembly is coupled to the drive shaft independent of the electric motor. The vehicle drive system also includes a gear train unit that has the drive shaft as an input shaft, and includes an output shaft connected to the wheel. The gear train unit transmits power from one of the electric motor or gas turbine assembly to the wheel.

The vehicle drive system may include one or more of the following features: The electric motor is a high speed electric motor, where high speed is defined as an ability to operate at speeds in a range of 50,000 rpm to 150,000 rpm. The gas turbine assembly further comprises a recuperator disposed in the fluid path between an outlet of the compressor and an inlet of the burner, the recuperator configured to use the exhaust gas that is discharged from the turbine to heat the compressed air. The gear train unit is configured to provide an output shaft rotational speed that is less than that of the drive shaft. The gear train unit provides a rotational speed reduction between the drive shaft and the output shaft in a range of 30:1 to 100:1. The gear train unit is a fixed ratio speed transmission device. The gear train unit includes a planetary gear set. The vehicle drive system further includes a battery connected to the electric motor via an inverter. The vehicle drive system further includes a bi-directional controller configured to permit conversion of direct current to alternating current and conversion of alternating current to direct current via an inverter. The vehicle drive system further includes a controller connected to the electric motor and the gas turbine assembly, and the controller is configured to control the electric motor and the gas turbine assembly to provide power to the wheel in a first mode in which the electric motor is operated to propel the vehicle and the gas turbine assembly is not operated; a second mode in which the electric motor is operated to propel the vehicle, and the gas turbine assembly is operated to provide propulsion power in addition to that provided by the electric motor; and a third mode in which the electric motor does not contribute to vehicle propulsion and the gas turbine assembly is operated to propel the vehicle. When the vehicle drive system is operated in the third mode, the electric motor operates as a generator and supplies power to a battery. The rotor is disposed on the drive shaft between the turbine wheel and the compressor wheel. The compressor wheel is disposed on the drive shaft between the turbine wheel and the rotor. During operation of the gas turbine assembly, the gas turbine assembly undergoes open Brayton thermodynamic cycles in which the expansion of heated gas from the burner within the turbine results in rotation of the drive shaft, which in turn results in rotation of the wheel.

A vehicle includes a vehicle drive system having an electric motor and an open Brayton cycle gas turbine assembly. The electric motor includes a rotor coupled to a drive shaft of the system. The gas turbine assembly includes a turbine including a turbine wheel mounted on the drive shaft, a burner that burns fuel and provides exhaust gas to drive the turbine wheel, and a compressor that provides compressed air to the burner. The gas turbine assembly is coupled to the drive shaft of the electric motor. The drive system also includes gear train unit that has the drive shaft as an input shaft, and has an output shaft connected to the vehicle wheels. The gear train unit transmits power from one of the electric motor or turbine to the wheel.

The vehicle including the vehicle drive system typically achieves greater fuel economy and generates lower emissions than conventional internal combustion engine-powered vehicles. The vehicle including the vehicle drive system can be manufactured and operated at a lower cost than some conventional vehicles, as discussed further below.

In the vehicle drive system disclosed herein, the rotor of the electric motor and the turbine wheel of the gas turbine assembly are directly mounted on a single drive shaft, and the drive shaft is used to transmit power from one or both of the electric motor or gas turbine assembly to the vehicle wheel. By this configuration, the power plant and drive train can be made more compact. In addition, the drive train is simplified relative to some conventional vehicle drive systems in which at least one of the power sources is indirectly coupled to a drive shaft and that employ a series of clutches to connect each power source to the drive shaft.

Advantageously, the vehicle drive system disclosed herein relies on solely the electric motor during normal driving operation, and relies on both the electric motor and the gas turbine assembly for peak power needs, whereby the electric motor can be made relatively small in size, for example by being designed for average usage rather than peak power usage. The relatively small electric motor can have less internal losses, lower weight and cost less to manufacture than a conventional electric motor used in this application.

The electric motor is a high speed motor that operates at speeds of at least 50,000 rpm. By using a high speed motor, the motor size, including the amount of winding material, magnetic material and housing material, can be reduced relative to those of some conventional electric motors used to propel electric vehicles or electric hybrid vehicles. Such conventional electric motors typically operate in a speed range of 10,000 rpm to 15,000 rpm. Thus, the high speed motor advantageously has a lower weight and cost than some conventional electric motors used in vehicles. Although the high speed motor has relatively lower torque than some conventional motors, it has more than sufficient power, due to higher speed, for a vehicle to use at low to moderate cruising speeds. These features make vehicle drive system particularly efficient for short distance commuting or for use in city traffic where there are frequent stops, low-speed cruising and idling periods. Further advantageously, noise emissions are reduced, particularly at idling and low operating speeds, in comparison to some conventional-engine vehicles.

By combining the high speed electric motor with the open Brayton cycle gas turbine assembly, the gas turbine assembly can provide supplemental power during periods of acceleration or high velocity travel.

The open Brayton cycle gas turbine assembly can also be operated independently of the electric motor, for example as a range extender during instances when the battery is low or depleted.

In some embodiments, the open Brayton cycle gas turbine assembly can be fueled using compressed natural gas (CNG), which is relatively low in cost and burns cleanly relative to some conventional carbon-based fuels.

The vehicle drive system includes a battery that supplies electric power to the electric motor. The battery has the capacity to store and reuse recaptured energy via a regenerative braking, which can be advantageous especially in stop-and-go traffic typical of the city driving conditions. The regenerative braking component captures significant amounts of energy during braking that are normally wasted as heat, and reduces vehicle speed by converting some of its kinetic energy into electricity, depending upon the power rating of the motor/generator.

Other objects and purposes of the invention, and variations thereof, will be apparent upon reading the following specification and inspecting the accompanying drawings.

DETAILED DESCRIPTION

Figure 1:
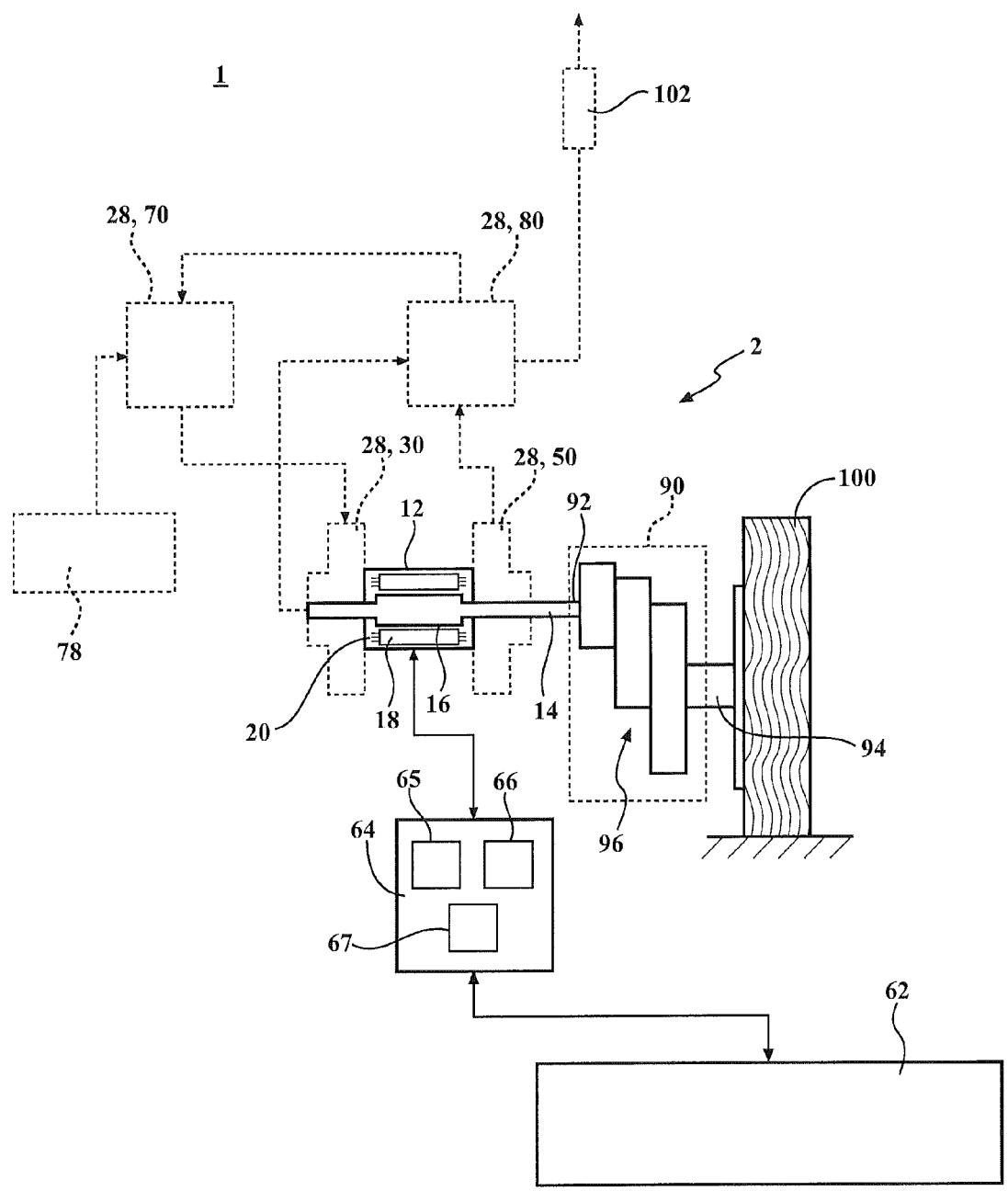
FIG. 1 is a schematic diagram of a vehicle drive system for a vehicle illustrating an electric drive mode of operation, and highlighting an electric drive portion of the drive system.
Figure 2:
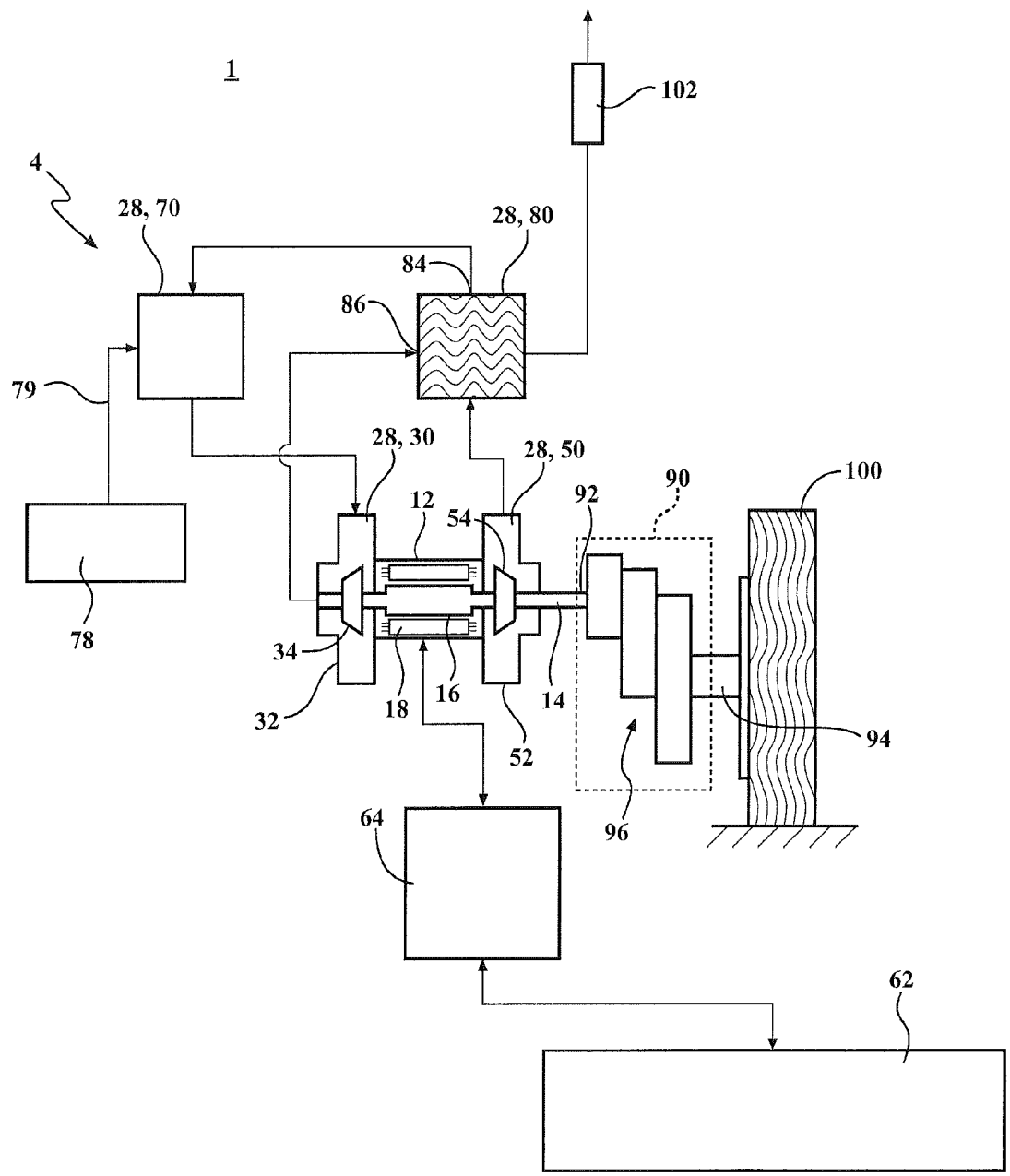
FIG. 2 is a schematic diagram of the vehicle drive system for a vehicle illustrating an electric drive with gas turbine assembly drive assist mode of operation, and highlighting both the electric drive portion and a gas turbine assembly drive portion of the drive system.
Figure 3:
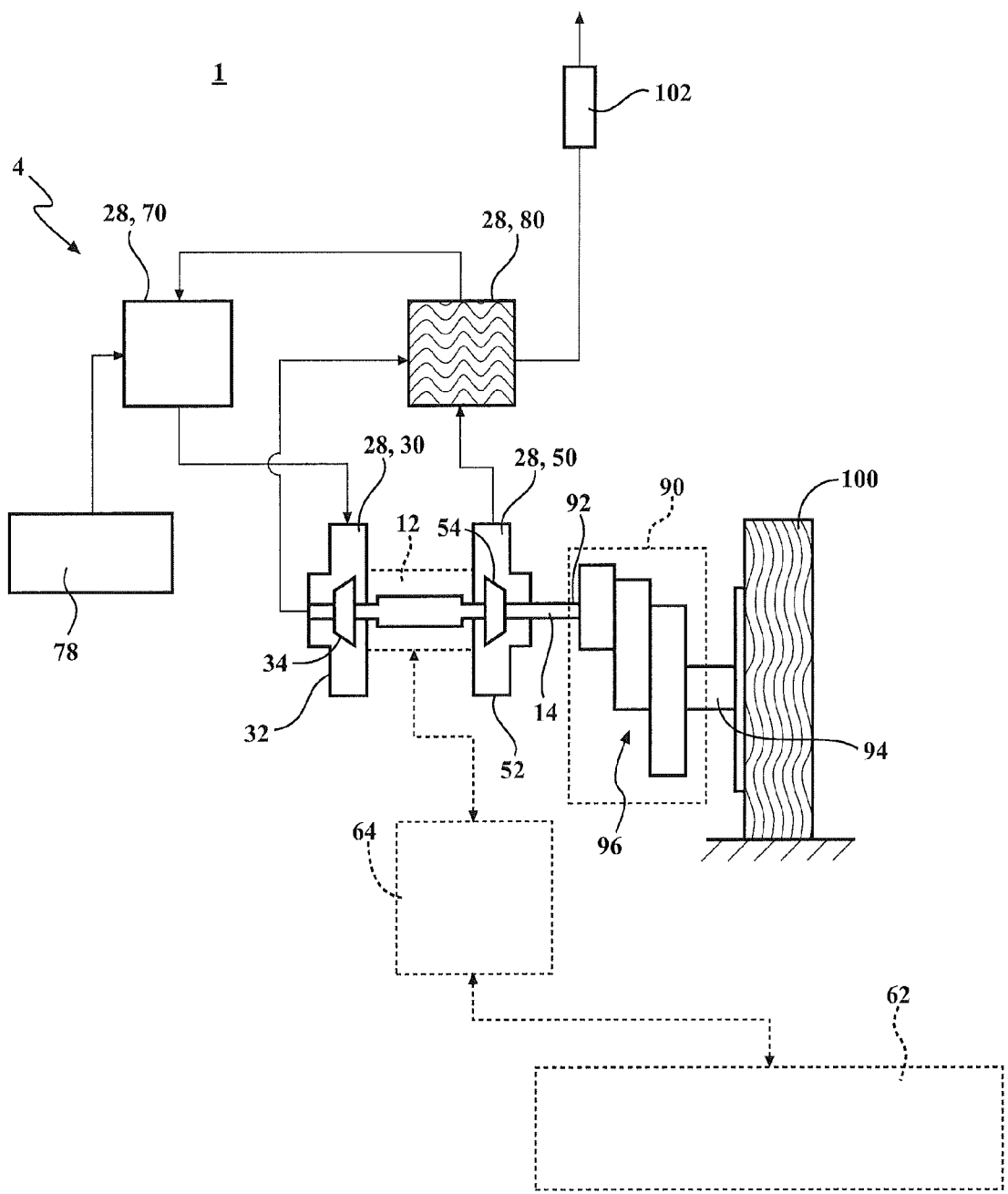
FIG. 3 is a schematic diagram of the vehicle drive system for a vehicle illustrating a gas turbine drive mode of operation, and highlighting the gas turbine drive portion of the drive system.

Referring to FIGS. 1-3, a vehicle drive system 1 for a passenger car and/or commercial vehicle has an electric motor 12 and an open Brayton cycle gas turbine assembly 28. The electric motor 12 and the gas turbine assembly 28 power the vehicle one at a time or in tandem, depending on the driving situation. For example, the electric motor 12 is a high speed electric motor that serves as the propulsion source for the vast majority of vehicle operating conditions, and is particularly suitable for city driving and light cruising environments. The gas turbine assembly 28 includes a fuel-fired burner 70 that receives compressed air from a compressor 50 and provides hot exhaust gas to a turbine 30, and is used to assist the electric motor 12 only when additional power is required such as during acceleration or during a steep climb. The gas turbine assembly 28 can be used instead of the electric motor 12 as a range extender when the battery is low or depleted. As discussed in detail below, in the vehicle drive system 1, the electric motor 12 and the gas turbine assembly 28 are both directly coupled to the same drive shaft 14 to transmit power from one of the electric motor 12 or gas turbine assembly 28 to the wheel 100.

Referring to FIG. 1, an electric drive portion 2 of the drive system 1 is used for vehicle propulsion during normal driving operation (e.g., during cruising) and during vehicle deceleration. The electric drive portion 2 of the drive system 1 includes the high speed electric motor 12, a battery 62, and an inverter/controller 64 that receives the direct current (DC) power from the battery 62, converts it to an alternating current (AC), and supplies it to the electric motor 12. In addition, the electric drive portion 2 of the drive system 1 includes a gear train unit 90 that is connected to the wheel 100 via an output shaft 94.

The electric motor 12 is operable either as a motor or a generator, and is a high-speed, AC induction motor that operates at speeds of at least 50,000 rpm and produces approximately 20 kW-30 kW of power. In some embodiments, for example, the electric motor operates at speeds in a range of 50,000 to 150,000 rpm or more. The electric motor 12 includes a rotor 16 that is directly coupled to a drive shaft 14, and a stator 18 that receives and surrounds the rotor 16.

The battery 62 supplies power to the electric motor 12, and may include one or more conventional rechargeable electric vehicle batteries. For example, the battery 62 may be a lithium-ion (Li-ion) battery, a nickel-metal hydride battery (NiMH), a lead-acid battery, an ultracapacitor or other suitable power source. The battery 62 may be recharged in place. For example, when the vehicle is not in use, the battery may be recharged via an external charger, and when the vehicle is in use, the battery may be recharged via power generated by the motor/generator 12 or by regenerative braking. In some embodiments, the battery 62 may be configured to be swappable, so that when the battery 62 is depleted, it can be easily removed and exchanged for a fully charged replacement battery 62. Power is transferred between the battery 62 and the electric motor 12 via the inverter/controller 64.

The inverter/controller 64 is a single integrated unit that includes an inverter 65, a controller 66 and a converter 67. The inverter 65 converts high-voltage DC supplied from the battery 62 into the multi-phase AC required to drive the electric motor 12, and also converts AC from the electric motor 12 into DC to charge the vehicle battery 62. The controller 66 controls vehicle propulsion by coordinating energy storage and propulsion sources, including controlling the operating mode of the drive system, as discussed further below. In addition, the controller 66 acts as communication interface to the vehicle and the electric drive portion 2 of the drive system 1, and acts as gateway between communication busses. The controller 66 is bi-directional in that it permits power to flow from the battery 62 to the electric motor 12 via the inverter 65, and also permits power to flow from the electric motor 12 to the battery 62 via the inverter 65. The converter 67 is a DC/DC converter that creates DC voltages to power ancillary functions of the vehicle, such as accessories, HVAC and power steering.

When the electric motor 12 is powered by the battery 62 and the inverter 65, rotation of the rotor 16 results in rotation of the drive shaft 14. Due to the very high rotational speed of the drive shaft 14 (e.g. in a range of 50,000 to 150,000 rpm or more), the gear train unit 90 is disposed between the electric motor 12 and the wheel 100. The gear train unit 90 includes a reduction gear set 96 that has the drive shaft 14 as an input shaft, and includes an output shaft 94 that directly drives the wheel 100 and determines the vehicle speed. For example, in some embodiments, the gear train unit 90 provides a fixed ratio rotational speed reduction between the drive shaft 14 and the output shaft 94 in a range of 30:1 to 100:1. In some embodiments, the gear train unit 90 provides a fixed ratio rotational speed reduction of 50:1. In the illustrated embodiment, the reduction gear set 96 that is a set of planetary gears, but the gear train unit 90 is not limited to using planetary gears to provide the desired speed reduction between the drive shaft 14 and the output shaft 94.

Since the electric drive portion 2 of the drive system 1 is used for vehicle propulsion during normal driving operation (e.g., during cruising) and during vehicle deceleration, a gas turbine drive portion 4 (described below) of the drive system 1 is not used during such driving operations.

However, during conditions that require high power output, such as during vehicle acceleration or steep climbing, the electric drive portion 2 may not always provide sufficient power to meet the demand. In such conditions, the gas turbine drive portion 4 of the drive system 1 is used in tandem with the electric drive portion 2 to assist the electric drive portion 2 in meeting the power demands.

Referring to FIG. 2, in the electric drive with gas turbine drive assist mode of operation, both the electric drive portion 2 and the gas turbine drive portion 4 of the drive system 1 are used. The gas turbine drive portion 4 of the drive system 1 includes the open Brayton cycle gas turbine assembly 28, the gear train unit 90 and the wheels 100.

The open Brayton cycle gas turbine assembly 28 includes a turbine 30, a burner 70 that burns fuel and discharges hot exhaust gas to the turbine 30, a compressor 50 that provides compressed air to the burner 70, and a recuperator 80 disposed in the air passage between the compressor 50 and the burner 70, and heats the compressed air delivered to the burner 70.

The turbine 30 includes a turbine wheel 34 disposed in a turbine housing 32 that receives exhaust gas from the burner 70. The turbine wheel 34 is fixed to the drive shaft 14. In some embodiments, the turbine wheel 34 is fixed to an end of the drive shaft 14 that is opposed to the end that serves as the input shaft of the gear train unit 90. When exhaust gas is expanded within the turbine housing 32 by passing it over the turbine wheel 34, the turbine wheel 34 causes rotation of the drive shaft 14. After expansion within the turbine housing 32, the exhaust gas is discharged from an exhaust gas outlet 36 (FIG. 5) and directed to an exhaust gas inlet 86 of the recuperator 80.

The burner 70 includes at least one combustion chamber which receives and mixes fuel from a fuel storage tank 78 and heated compressed air from the recuperator 80. An ignition source within the combustion chamber ignites the fuel-air mixture, whereby the burner 70 generates energy and produces a high temperature, high velocity exhaust gas. The exhaust gas is discharged from the burner 70 and directed to an exhaust gas inlet of the turbine housing 32.

In the illustrated embodiment, the burner 70 is configured to receive compressed natural gas (CNG), which is stored in the fuel storage tank 78 on the vehicle, and delivered to the burner 70 via a fuel delivery line 79. Fuel delivery to the burner 70 is controlled by the controller 66 of the inverter/controller 64. Although use of CNG as a fuel is advantageous due to its low cost and relatively clean combustion properties, the burner is not limited to combusting this type of fuel. Alternative fuels that may be used include, but are not limited to, jet fuel, kerosene or diesel fuel.

The compressor 50 includes a compressor wheel 54 disposed in a compressor housing 52. The compressor wheel 54 is mounted on the drive shaft 14, and is driven by rotation of the turbine wheel 34. The rotation of the compressor wheel 54 draws in fresh air through an air inlet 58 (shown in FIG. 5) and directs it through the compressor housing, and discharges compressed air. The discharged compressed air is directed to an air inlet 82 of the recuperator 80.

The recuperator 80 is a heat exchanger configured to recover the waste heat discharged from the turbine 30, and use the recovered waste heat to pre-heat the compressed air supplied by the compressor 50. The recuperator 80 is disposed in the air passage between the compressor 50 and the burner 70. In some embodiments, the recuperator 80 may be a plate-type heat exchanger, but is not limited to this type of heat exchanger. By preheating the compressed air prior to delivery to the burner 70, the amount of fuel required is reduced, and efficiency of the gas turbine assembly 28 is increased.

The recuperator 80 includes an air inlet 82 that receives the compressed, ambient temperature air discharged from the compressor 50, and an air outlet 84 that discharges compressed, heated air that is delivered to the burner 70. The recuperator 80 includes an exhaust gas inlet 86 that receives hot exhaust gas discharged from the outlet 36 of the turbine 30, and an exhaust gas outlet 88 that discharges relatively cooler exhaust gas to the environment. In some embodiments, the discharged gas may be treated in an emissions control device 102 such as a catalytic converter, or other device suitable to the fuel being burned, before being released to the environment.

The turbine 30, the burner 70, the compressor 50 and the recuperator 80 form the open Brayton cycle gas turbine assembly 28. In the illustrated configuration, the gas turbine assembly is expected to produce 100 kW or more of shaft power. A portion of the this power is consumed by the compressor 50, with the remaining power being delivered to the drive wheel 100. In some embodiments, as much as 70 percent of the gas turbine assembly-produced power may be consumed by the compressor, such that approximately 30 percent may be directed to the drive wheel 100. However, despite the losses to the compressor 50, the approximately 30 kW of power generated by the gas turbine assembly 28 is very roughly equivalent to the power produced by the electric motor 12.

Referring to FIG. 3, in some operating conditions, the gas turbine drive portion 4 of the drive system 1 can be used as sole the source of propulsion. It is contemplated for the drive system 1 that use of the gas turbine drive portion 4 as the sole source of propulsion will occur sparingly. For example, the gas turbine drive portion 4 can be the sole power provider when battery power is nearly or fully depleted, thus serving as a range extender.

When the gas turbine drive portion 4 of the drive system 1 is used as sole the source of propulsion, the electric drive portion 2 does not contribute to the propulsion of the vehicle. However, since the rotor 16 continues to rotate along with the drive shaft 14, the electric motor 12 is controlled by the controller 66 to operate as a generator that supplies power to the battery 62, further extending the range of the vehicle.

Figure 4:
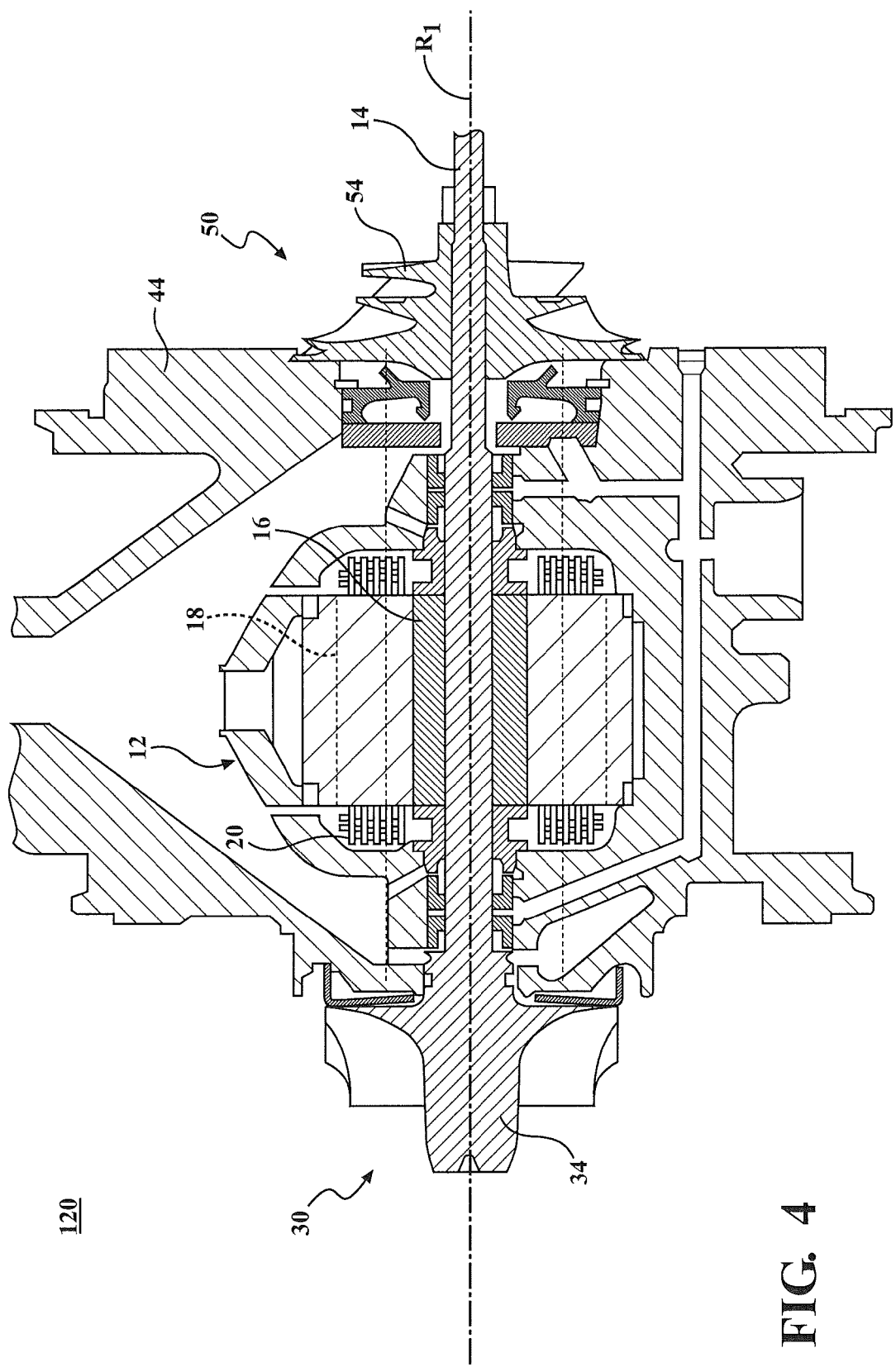
FIG. 4 is a side sectional view of a drive shaft configuration including a turbine wheel and compressor wheel mounted on the drive shaft with the rotor of the electric motor mounted on the drive shaft at a location between the turbine wheel and the compressor wheel. The turbine housing and the compressor housing are omitted for clarity.

Referring to FIG. 4, in the illustrated embodiment, the turbine 30, the compressor 50 and the electric motor 12 are integrated into a single drive unit 120 such that the electric motor 12 is housed with the turbine 30 and the compressor 50. In particular, the turbine wheel 34, the electric motor rotor 16 and the compressor wheel 54 are mounted in common on the drive shaft 14 such that the rotor 16 is disposed intermediate the turbine wheel 34 and the compressor wheel 54. The configuration of the drive unit 120 has the appearance of an electrically assisted turbocharger. However, the drive unit 120 differs from an electrically assisted turbocharger in that external work is done by the rotating drive shaft 14.

Figure 5:
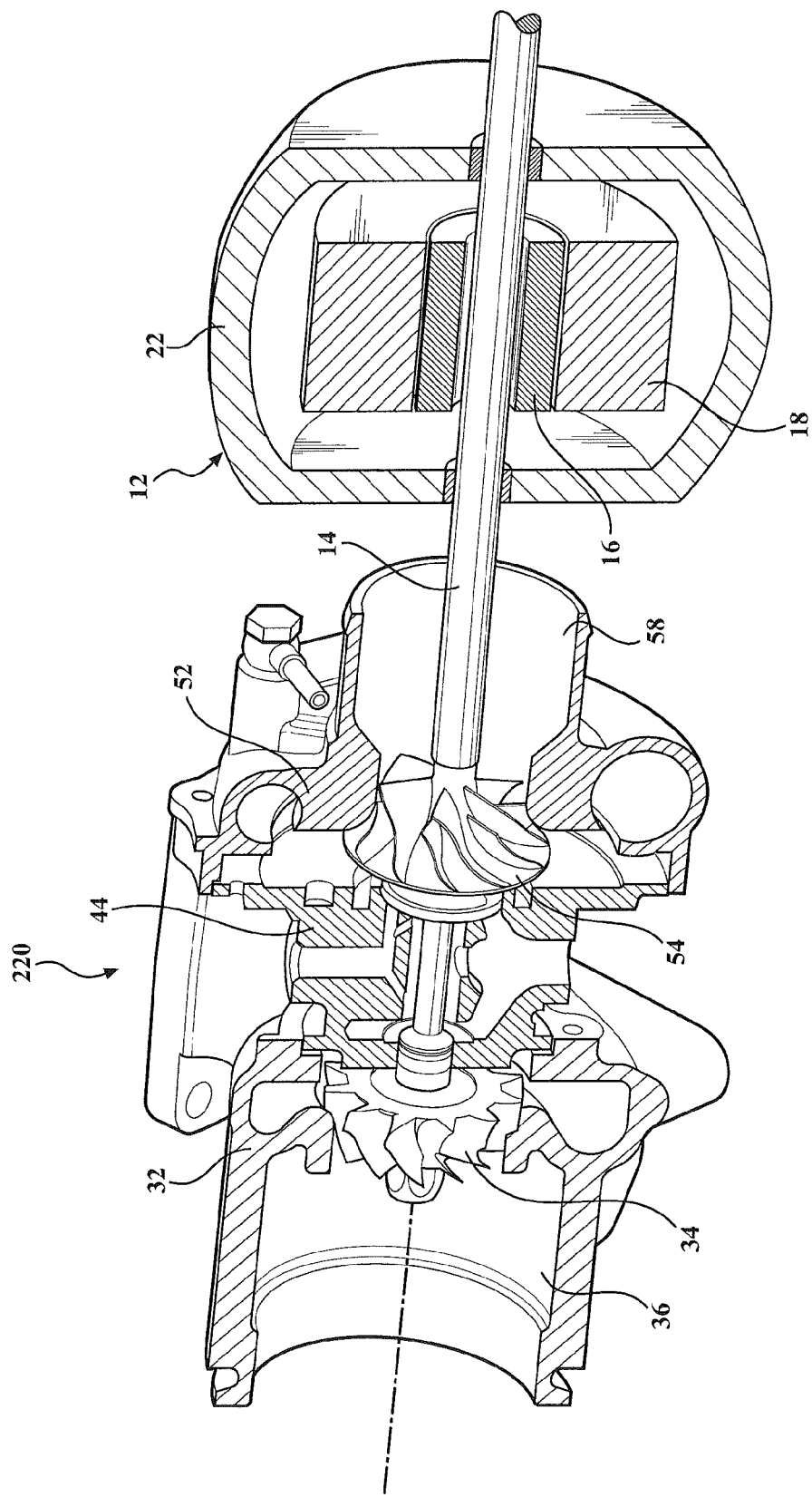
FIG. 5 is a side sectional view of an alternative drive shaft configuration including a turbine wheel, compressor wheel and rotor of the electric motor mounted on the drive shaft with the compressor wheel mounted on the drive shaft at a location between the turbine wheel and the rotor.

Referring to FIG. 5, the turbine 30, the compressor 50 and the electric motor 12 are not limited to the arrangement shown in FIG. 4. For example, in some embodiments, the electric motor 12 may be integrated with the drive shaft 14 at a location axially spaced apart from an alternative drive unit 220 that includes the turbine 30 and the compressor 50. In the illustrated embodiment, the electric motor 12 is integrated with the drive shaft 14 at a location outboard of the drive unit 220 such that the rotor 16 is disposed on the compressor side of the drive unit 220. This location reduces the exposure of the electric motor 12 to the elevated temperatures of the turbine 30. In particular, the turbine wheel 34, the electric motor rotor 16 and the compressor wheel 54 are mounted in common on the drive shaft 14 such that the compressor wheel 54 is disposed intermediate the turbine wheel 34 and the rotor 16.

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

What is claimed is:

1. A vehicle drive system (1) for driving a wheel (100) of a vehicle, the system (1) comprising:
an electric drive portion (2) including as high-speed electric motor (12) including a shaft (14) for driving the wheel (100);
a gas turbine drive portion (4) including a gas turbine assembly (28) comprising a turbine wheel (30) mounted on the shaft (14), a burner (70) for providing a stream of gas for driving the turbine wheel (30) and including an inlet for receiving compressed air, a compressor wheel (50) mounted on the shaft (14) and having an outlet for supplying compressed air to the burner (70), and a recuperator (80) disposed in the fluid path between the outlet of the compressor (50) and the inlet of the burner (70), the recuperator (80) configured to scavenge heat from the exhaust gas that is discharged from the turbine (30) to heat the compressed air being supplied to the burner (70), the gas turbine assembly (28) being directly coupled to the shaft (14) for driving the wheel (100) independent of the electric motor (12), wherein the gas turbine drive portion is operatively coupled in tandem with the electric drive portion (2) to assist the electric drive portion (2); and
a gear train unit (90) operatively coupled between the shaft (14) and the wheel (100) of the vehicle for transmitting power from one of the electric motor (12) or gas turbine assembly (28) or both to the wheel (100); and
a controller (66) connected to the electric motor (12) and the gas turbine assembly (28), the controller (66) configured to control the electric motor (12) and the gas turbine assembly (28) to provide power to the wheel (100) in
a first mode, in which the electric motor (12) is operated during normal driving operation and the gas turbine assembly (28) is not operated;
a second mode, in which higher power is required, and in which the electric motor (12) is operated to propel the vehicle and the gas turbine assembly (28) is operated to provide propulsion power in addition to that provided by the electric motor (12); and
a third mode, in which the gas turbine assembly (28) propels the vehicle and the electric motor (12) does not contribute to vehicle propulsion but operates as a generator to charge a battery.

2. A vehicle drive system (1) for driving a wheel (100) of a vehicle, the system (1) comprising:
a drive shaft (14);
a high-speed electric motor (12) including
a rotor (16) coupled to the drive shaft (14), and
a stator (18) that receives the rotor (16);
a gas turbine assembly (28) including
a turbine (30) including a turbine wheel (34) mounted on the drive shaft (14),
a burner (70) that burns fuel and provides exhaust gas to drive the turbine wheel (34), and
a compressor (50) that provides compressed air to the burner (70), the compressor (50) including a compressor wheel (54) mounted on the drive shaft (14), whereby the gas turbine assembly (28) is coupled to the drive shaft (14) independent of the electric motor (12);
a gear train unit (90) that has the drive shaft (14) as an input shaft, and includes an output shaft (94) connected to the wheel (100), the gear train unit (90) transmitting power from one of the electric motor (12) or gas turbine assembly (28) to the wheel (100); and
a controller (66) connected to the electric motor (12) and the gas turbine assembly (28), the controller (66) configured to control the electric motor (12) and the gas turbine assembly (28) to provide power to the wheel (100) in a first mode, in which the electric motor (12) is operated during normal driving operation and the gas turbine assembly (28) is not operated;

a second mode, in which higher power is required, and in which the electric motor (12) is operated to propel the vehicle and the gas turbine assembly (28) is operated to provide propulsion power in addition to that provided by the electric motor (12); and a third mode, in which the gas turbine assembly (28) propels the vehicle and the electric motor (12) does not contribute to vehicle propulsion but operates as a generator to charge a battery.

3. The vehicle drive system (1) of claim 2, wherein the high speed electric motor (12) is able to operate at speeds in a range of 50,000 rpm to 150,000 rpm.

4. The vehicle drive system (1) of claim 2, wherein the gas turbine assembly (28) further comprises a recuperator (80) disposed in the fluid path between an outlet of the compressor (50) and an inlet of the burner (70), the recuperator (80) configured to use the exhaust gas that is discharged from the turbine (30) to heat the compressed air.

5. The vehicle drive system (1) of claim 2, wherein the gear train unit (90) is configured to provide an output shaft (94) rotational speed that is less than that of the drive shaft (14).

6. The vehicle drive system (1) of claim 2, wherein the gear train unit (90) provides a rotational speed reduction between the drive shaft (14) and the output shaft (94) in a range of 30:1 to 100:1.

7. The vehicle drive system (1) of claim 2, wherein the gear train unit (90) is a fixed ratio speed transmission device.

8. The vehicle drive system (1) of claim 2, wherein the gear train unit (90) includes a planetary gear set.

9. The vehicle drive system (1) of claim 2, further comprising a battery (62) connected to the electric motor (12) via an inverter (65).

10. The vehicle drive system (1) of claim 2, further comprising a bi-directional controller (66) configured to permit conversion of direct current to alternating current and conversion of alternating current to direct current via an inverter (65).

11. The vehicle drive system (1) of claim 2, wherein when the vehicle drive system (1) is operated in the third mode, the electric motor (12) operates as a generator and supplies power to a battery (62).

12. The vehicle drive system (1) of claim 2, wherein the rotor (16) is disposed on the drive shaft (14) between the turbine wheel (34) and the compressor wheel (54).

13. The vehicle drive system (1) of claim 2, wherein the compressor wheel (54) is disposed on the drive shaft (14) between the turbine wheel (34) and the rotor (16).

14. The vehicle drive system (1) of claim 2, wherein during operation of the gas turbine assembly (28), the gas turbine assembly (28) undergoes open Brayton thermodynamic cycles in which the expansion of heated gas from the burner (70) within the turbine (30) results in rotation of the drive shaft (14), which in turn results in rotation of the wheel (100).

* * * * *